Feb. 15, 1949. N. E. ANDERSON 2,461,585
TRACER WITH POWER-DRIVEN STEERABLE TRACTION WHEEL
Filed May 22, 1947 2 Sheets-Sheet 1
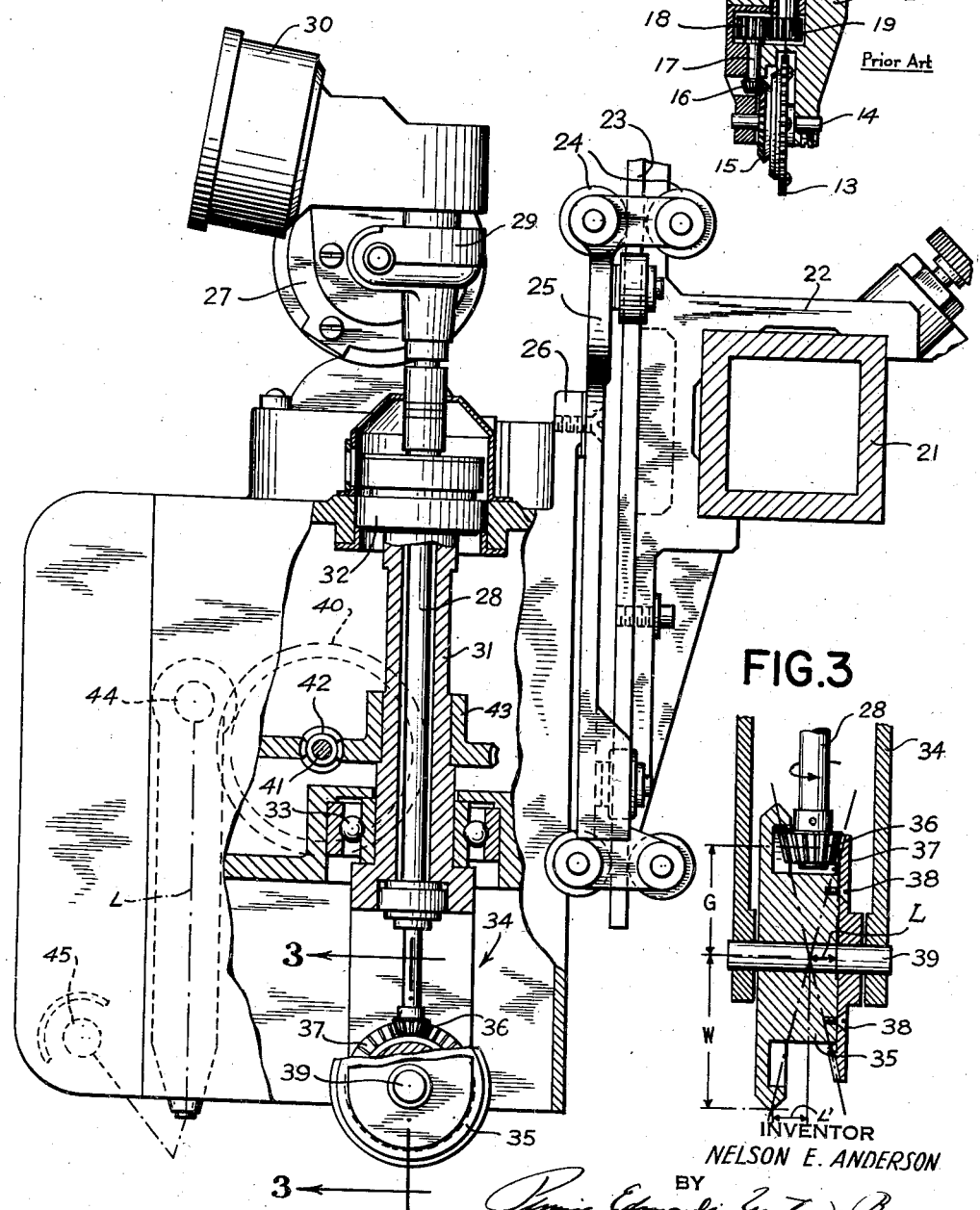
INVENTOR
NELSON E. ANDERSON
BY
ATTORNEYS Feb. 15, 1949.   N. E. ANDERSON   2,461,585
TRACER WITH POWER-DRIVEN STEERABLE TRACTION WHEEL
Filed May 22, 1947   2 Sheets-Sheet 2

INVENTOR
NELSON E. ANDERSON
BY
ATTORNEYS

Patented Feb. 15, 1949

2,461,585

UNITED STATES PATENT OFFICE 2,461,585

TRACER WITH POWER-DRIVEN STEERABLE TRACTION WHEEL

Nelson E. Anderson, Scotch Plains, N. J., assignor to Air Reduction Company, Incorporated, a corporation of New York Application May 22, 1947, Serial No. 749,810

11 Claims. (Cl. 250—41.5)

This invention relates to apparatus of the type that is propelled and steered by a power-driven steerable traction wheel. More particularly the invention relates to power-driven steerable tracers for guiding the course of an instrumentality, such as a welding or cutting torch, in accordance with a drawing or pattern traced by the tracer. Tracers of this kind are commonly used on universal cutting or welding machines such as those of the pantograph type in which a gas cutting or welding torch is mounted on one part of a pantograph structure, such as the front bar of a folding parallelogram frame, and the tracer is mounted on another part so that the torch is capable of universal movement in a plane and so that when the tracer is caused to follow the outline of the pattern the torch will be guided accordingly.

One type of tracer for use in this way comprises a traction wheel that rolls on the surface containing the pattern. The traction wheel is power-driven at constant speed by an electric motor through a drive shaft the axis of which intersects the axis about which the traction wheel rotates. The traction wheel is rotated from the drive shaft by suitable reduction gearing. The axle of the traction wheel is journalled in a sleeve or other member which is rotatable about the axis of the drive shaft. By rotating this member the traction wheel can be steered so that some point on the tracer used as a reference point, or pattern-tracing point, can be made to follow the outline of the pattern.

The traction wheel is usually steered by hand, but recently an electronic tracer has come into use in which the traction wheel is automatically steered to cause the tracer to follow the outline of the pattern. The electronic tracer has means for projecting a beam of light on the line forming the pattern and the light is reflected into a photoelectric cell in the tracer. The variation in the amount of light received by the photo-electric cell if the tracer deviates too far from the course it is supposed to follow causes the steering mechanism to steer the traction wheel so as to bring the tracer back onto its proper course.

In all previous power-driven tracers of the kind above described in which the drive motor is stationary with respect to the frame of the device, the steering of the traction wheel, whether done manually or automatically, influences the speed of rotation of the traction wheel. This is undesirable when the instrumentality moved by the tracer should travel at some selected uniform speed as in the case of an oxygen cutting-torch, because when the tracer is turning a corner the tracer and hence the torch or other instrumentality are caused to travel faster or slower than the desired speed. Moreover, the driving of the traction wheel from the drive shaft produces a torque which tends to impart rotation to the member in which the traction wheel is journalled and hence tends to steer the traction wheel. This is especially undesirable when the traction wheel is automatically steered, as in an electronic tracer, because any steering torque produced by the driving mechanism biases the automatic steering mechanism.

The principal object of this invention is to provide a tracer or other apparatus having a power-driven steerable traction wheel of the kind above described in which the desired rate of speed at which the apparatus is propelled by the traction wheel is not influenced by the steering of the traction wheel.

Another object is to provide a tracer or other apparatus having a power-driven steerable traction wheel of the kind above described, in which the steering torque imparted to the traction wheel assembly by the driving mechanism is counteracted or nullified so that it does not affect the intentional steering of the traction wheel.

A further object is to provide a power-driven automatically steered tracer, such as a tracer of the electronic type, in which the steering torque imparted to the traction wheel assembly by the driving mechanism is counteracted or nullified so that it does not bias the automatic steering mechanism.

The invention is illustrated in the accompanying drawings, in which:

Figure 1 is a vertical section through the lower portion of the traction wheel assembly of a power-driven tracer of the prior art;

Fig. 2 is a side elevation of an electronic tracer embodying the invention, certain parts being shown in vertical section;

Fig. 3 is an enlarged vertical section taken on the line 3—3 of Fig. 2;

Figure 4:
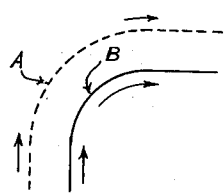
Figs. 4, 5 and 6 are explanatory diagrams illustrating the principle of operation of the invention.

To give a correct understanding of how the steering of the traction wheel of a power-driven tracer has heretofore had an undesirable effect on the speed of rotation of the traction wheel, and how the driving of the traction wheel produces an objectionable steering torque, the prior art type of drive for the traction wheel has been illustrated in Fig. 1 and will first be described. Referring to this figure, a portion of the main frame of the tracer is shown at 11. It rotatably supports a member or sleeve 12. A traction wheel 13 has an axle 14 which is journalled in the lower end of the member 12. A bevel gear 15 attached to the side of the traction wheel is driven by a bevel pinion 16 on the lower end of a stub shaft 17 mounted to rotate in the member 12. A spur gear 18 connected to the upper end of the stub shaft 17 meshes with a spur gear 19 fastened to the lower end of the drive shaft 20. The drive shaft is driven at a constant speed from a motor (not shown) which is secured directly or indirectly to the frame 11. The axis of the drive shaft 20 intersects the axis of the traction wheel axle 14, and the point of contact of the traction wheel with the surface along which the wheel rolls is in line with the axis of the drive shaft. The member 12 is rotatable about the axis of the drive shaft and when so rotated changes the orientation or direction of travel of the traction wheel. In a hand steered tracer the member 12 is rotated manually to cause a given pattern-tracing point on the tracer (usually the lower end of a pointer which is located alongside of the traction wheel and which points approximately to the place where the traction wheel makes contact with the surface along which it rolls) to follow the outline of the pattern. In an automatically steered tracer, such as a tracer of the electronic type, the member 12 is rotated by an electric motor controlled automatically in the normal operation of the tracer but which can also be controlled when desired by a hand-operated switch, as will later appear.

To propel the tracer the shaft 20 is driven and rotates the traction wheel 13 through the gear train shown. When the member 12 is rotated about the axis of the drive shaft 20 to turn the traction wheel assembly and change the direction of travel of the tracer, the driven spur gear 18, being carried by the member 12, revolves in a planetary fashion about the driving spur gear 19 on the drive shaft. This planetary action of the gearing adds to or subtracts from the rotation of the stub shaft 17 and the traction wheel depending upon the direction in which the member 12 is turned. Thus, during the time the direction of travel of the tracer is being varied, as when the traction wheel assembly is being turned to cause the pattern-tracing point on the tracer to trace an arc or a complete circle, the linear speed of such point is increased or decreased by the amount of rotation added to or subtracted from the traction wheel by the planetary action of the gearing. If the tracer is used for moving and guiding an oxygen cutting-torch this departure in speed from the desired speed at which it moves when the tracer is moving along a straight line may result in losing the cut or in increasing the width of the kerf.

It will also be seen from Fig. 1 that the gear 19 in driving the gear 18 to propel the tracer exerts a force which acts at radius R to produce a steering torque that tends to turn the traction wheel assembly about the axis of the drive shaft and change the direction of travel of the traction wheel. This steering torque is objectionable because it affects the intentional steering of the traction wheel. It can affect the steering of the traction wheel and make it more difficult to steer even when the traction wheel is steered manually, but it is particularly objectionable in an automatically steered tracer because of the resulting bias on the automatic steering mechanism.

The speeding up and slowing down of the traction wheel by the above-mentioned planetary action of the gearing during the time the direction of travel of the traction wheel is being varied, and the steering torque produced by the driving mechanism, are inherent in all previous power-driven tracers, in which the drive motor is stationary with respect to the frame, regardless of the type of gearing between the drive shaft and the traction wheel.

Figs. 2 and 3 illustrate an electronic tracer embodying the invention that is propelled at a constant speed along all portions of the pattern even when rounding a corner, and in which the steering torque produced by the driving mechanism is counteracted so that it does not bias the automatic steering mechanism.

Referring first to Fig. 2, the front bar of the folding parallelogram frame of a universal cutting or welding machine is represented at 21. The electronic tracer is secured to this bar by means of a bracket 22. A plate 23 attached to the bracket acts as a guide and track for rollers 24. These rollers have axles secured to a plate 25 to which the frame 26 of the electronic tracer is attached.

Supported by the frame 26 is an electric drive motor 27 which rotates a drive shaft 28 through reduction gearing 29. The motor 27 has a speed control governor (not shown) which can be adjusted so that the drive shaft 28 is rotated at a desired constant speed. A tachometer 30 is responsive to the rotational speed of the drive shaft 28 and gives a visual indication of the speed of travel of the tracer.

The drive shaft 28 is mounted to rotate in a sleeve 31 which in turn is rotatable about the axis of the drive shaft in bearings 32 and 33. The lower end of the sleeve 31 is connected to a bifurcated member 34 between the two arms of which the traction wheel 35 and its associated mechanism are positioned.

Referring now to Fig. 3, which is an enlarged sectional view taken on the line 3—3 of Fig. 2, there is secured to the lower end of the drive shaft 28 a bevel pinion 36 which meshes with a bevel gear 37. The gear 37 is rigidly secured to the traction wheel 35 by screws 38. The traction wheel and the bevel gear 37 are mounted on an axle 39 that is journalled in the two arms of the bifurcated member 34. Thus the shaft 28 rotates the traction wheel 35 through the bevel gearing 36—37 at a predetermined desired speed when the traction wheel is traveling in a straight line.

By rotating the sleeve 31 far enough the angular position of the traction wheel 35 may be varied through 360°. The sleeve is rotated in one direction or the other to steer the traction wheel by means of a reversible electric motor 40. The steering motor rotates a shaft 41 carrying a worm 42 which meshes with a worm wheel 43 fastened to the sleeve 31. A light source represented at 44 is located within the housing of the tracer. A beam of light represented by the line L is projected through the bottom of the housing onto the line of the pattern and is reflected back into a photo-electric cell represented at 45. The steering motor 40 responds to changes in the amount of light received by the photo-electric cell from the pattern line and rotates the sleeve 31 in one direction or the other to steer the traction wheel and thereby cause the tracer to follow the line of the pattern in a manner well understood in the art. Switch means (not shown) may be provided for disconnecting the steering motor from its automatic steering control circuit and connecting it to a hand-operated momentary contact switch by means of which the steering motor can be controlled manually when desired to steer the traction wheel.

In an electronic tracer it is the spot of projected light that follows directly on the pattern line but, of course, every point on the tracer housing will move in a path having the same shape and size as the pattern. While the traction wheel is automatically steered to cause the spot of light to follow the line of the pattern, the traction wheel itself may be moving along a path which does not necessarily coincide with the pattern.

According to the invention the traction wheel 35 is positioned so that its point of contact with the surface along which it rolls is located, not in line with the axis of the drive shaft as heretofore, but to one side of the axis of the drive shaft as shown in Fig. 3. When the gears between the drive shaft and the traction wheel are arranged as shown in Fig. 3, the traction wheel should be located on the left side of the drive shaft is viewed in this figure, for the reason that will later appear. Now, assuming for the purpose of explanation and to contrast the operation of a tracer having an offset traction wheel of the kind shown in Fig. 3 with the operation of previous tracers of the kind shown in Fig. 1, that the pattern-tracing point is located in line with the axis of the drive shaft, it will be seen from Fig. 3 that if the drive shaft is rotated in the direction of the arrow the traction wheel will be rotated in a direction such that the tracer will be propelled away from the reader. If the sleeve in which the traction wheel is journalled is turned from left to right to steer the traction wheel so that the tracer will make a righthand turn, the direction of movement of the sleeve and the direction in which the gear 37 revolves in a planetary fashion about the gear 36 will be in a direction opposite to that in which the drive shaft is rotating and the planetary action of the gearing will cause the traction wheel to speed up. However, it will be seen from Fig. 4, in which the solid line represents the portion of the pattern traced by the axis of the drive shaft and the dotted line represents the path followed by the traction wheel, that when the sleeve is turned to steer the traction wheel the traction wheel travels along an arc A which lies outside of and is longer than the arc B traced by the axis of the drive shaft. The longer distance through which the traction wheel is caused to travel while the axis of the drive shaft is traversing its arc at least partly compensates for the speeding up of the traction wheel caused by the planetary action of the gearing, thereby making the rate of speed at which the axis of the drive shaft traverses the arc B to more nearly conform to the rate of speed at which it traverses the straight-line portions of the pattern.

Figure 5:
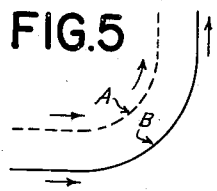

Fig. 5 shows the paths followed by the axis of the drive shaft and by the traction wheel when the traction wheel is steered to cause the tracer to make a lefthand turn under the same conditions as previously described, i. e., when the drive shaft is rotating in the direction of the arrow shown in Fig. 3. The sleeve in which the traction wheel is journalled is now turned from right to left, i. e. in the same direction in which the drive shaft is rotating. The planetary action of the gearing will then slow down the rotation of the traction wheel, but it will be seen from Fig. 5 that the arc A followed by the traction wheel is now inside the arc B traced by the axis of the drive shaft and the shorter path which the traction wheel is caused to follow during the time that the axis of the drive shaft is traversing its arc at least partly compensates for the slowing down of the traction wheel caused by the planetary action of the gearing.

Even if the drive shaft rotates in a direction opposite to that indicated by the arrow in Fig. 3 the tracer will operate in the same way as just described but the traction wheel and the tracer will then, of course, travel in a direction opposite to that indicated by the arrows in Figs. 4 and 5.

The traction wheel should be positioned on that side of the drive shaft such that rotation of the member in which the traction wheel is journalled in a direction that speeds up the rotation of the traction wheel causes the traction wheel to travel in an arc which is outside the arc traced by the axis of the drive shaft and such that rotation of such member in a direction that slows down the rotation of the traction wheel causes the traction wheel to travel in an arc which is inside the arc traced by the axis of the drive shaft.

While any amount of offset of the traction wheel with respect to the axis of the drive shaft up to a certain limit will be beneficial by producing some compensating action for the change in speed of rotation of the traction wheel brought about by the planetary action of the gearing when the traction wheel assembly is turned to steer the traction wheel, exact compensation can be obtained by offsetting the traction wheel from the axis of the drive shaft a distance such that the ratio of the traction wheel radius to such distance is equal to the reduction ratio of the gearing, as will now be shown.

If C represents the circumference of the traction wheel its radius is $$\frac{C}{2\pi}$$

Assuming the gear reduction ratio is 3 to 1, the planetary action of the gearing which would occur if the sleeve 31 were rotated through one revolution while the drive shaft is stationary would cause one-third of a revolution of the traction wheel because this is equivalent to rotating the drive shaft through one revolution. A point on the circumference of the traction wheel would therefore advance or retrogress one-third of the circumference of the traction wheel depending upon the direction in which the sleeve is turned. If it be assumed that the pattern to be traced is a complete circle, and if the direction in which the sleeve 31 is turned during the tracing of the circle is such as to cause the planetary action of the gearing to add to the speed at which the traction wheel is driven by the drive shaft, then the one revolution of the sleeve that is required to steer the traction wheel in a circle and thereby cause the pattern-tracing point on the tracer to trace the complete pattern circle will advance a point on the circumference of the traction wheel one-third the circumference of the traction wheel, or C/3. This amount of rotation of the traction wheel is added to its rotation by the drive shaft and results in speeding up the travel of the traction wheel, so that whereas it would take a certain interval of time for the pattern-tracing point on the tracer to trace the pattern circle if there were no planetary action of the gearing, the circle is now traced in a shorter interval of time due to the speeding up of the traction wheel by the planetary action of the gearing. To cause the pattern-tracing point on the tracer to trace the pattern circle in the same interval of time in both cases, the path traveled by the traction wheel during the time that it is causing the pattern-tracing point to trace the circle must be lengthened by the amount that the traction wheel is rotated circumferentially by the planetary action of the gearing, i. e. the traction wheel must be caused to travel along a circle which is C/3 longer in circumference than the circle traced by the pattern-tracing point. Therefore, the traction wheel must be offset with respect to the axis of the drive shaft by a distance such that the additional path C/3 is accounted for in one bodily revolution of the traction wheel about the axis of the drive shaft which occurs when the sleeve 31 is rotated through one revolution to steer the traction wheel in a complete circle. This additional path is equivalent to a circle whose circumference is C/3 in length and which would be followed by the traction wheel if the sleeve 31 were rotated through one revolution about the axis of the drive shaft while the drive shaft is not rotating and has no translation. The radius of such a circle is the amount of offset that must be given to the traction wheel, and from the equation $$2\pi r = \frac{C}{3}$$

it will be seen that $$r = \frac{C}{6\pi}$$

The radius of the traction wheel is $$\frac{C}{2\pi}$$

as above stated, and hence the ratio of the traction wheel radius to the offset distance of the traction wheel is 3 to 1—the same as the reduction ratio of the gearing.

Figure 6:
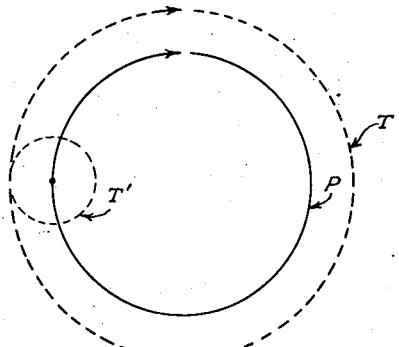

Taking a specific example, and still assuming that the gear reduction ratio is 3 to 1, let it be assumed that the circumference of the traction wheel is 6 inches and that a pattern is to be traced in the form of the complete circle P shown in Fig. 6 having a 6 inch circumference. Also, to simplify the explanation it will be assumed that the pattern-tracing point is in line with the axis of the drive shaft, although it might be any other point on the tracer, as previously stated. If a prior art tracer of the kind shown in Fig. 1 were used to trace such a circle, and if there were no planetary action of the gearing which speeds up or slows down the rotation of the traction wheel, three revolutions of the drive shaft would cause the traction wheel to traverse the complete circumference of the circle. Assuming that the desired linear speed of the cutting torch or other instrumentality moved by the tracer is such as to call for a setting of the motor governor that will produce one revolution of the drive shaft 28 in 10 seconds, the circle would be traced in 30 seconds and this may be taken as the time in which the pattern circle should be traced to cause the linear speed of the tracer, and the instrumentality moved by it, to be the same when tracing an arc or circle as when moving in a straight line. Because of the planetary action of the gearing, however, one complete revolution of the sleeve 31 will cause the traction wheel to advance a circumferential distance of 2 inches. Therefore, the entire 6 inch circle will have been traversed by the traction wheel in two revolutions of the drive shaft (or 20 seconds) since this much turning of the drive shaft will account for the remaining circumferential distance of 4 inches travelled by the traction wheel. The traction wheel must therefore be offset with respect to the axis of the drive shaft a distance such that the traction wheel will then travel in a circle T whose circumference is 2 inches longer than the 6 inch circle P traced by the axis of the drive shaft and this circle will then be traversed by the traction wheel in three revolutions of the drive shaft, or 30 seconds, which, as above stated, is the desired time in which the axis of the drive shaft should trace the pattern circle P. The additional 2 inch path that the traction wheel is caused to traverse by its offset relation to the drive shaft axis in one revolution of the sleeve 31 is equivalent to a circle T' (Fig. 6) whose circumference is 2 inches in length and that would be traversed by the traction wheel in one revolution of the sleeve about the axis of the drive shaft if the drive shaft is not rotated and has no translation. The radius of the circle T' derived from the equation-circumference $= 2\eta r$ is $$\frac{2}{2\pi} \text{ or } \frac{1}{\pi}$$

and is the amount of offset that should be given to the traction wheel. The radius of the traction wheel itself is $$\frac{6}{2\pi} \text{ or } \frac{3}{\pi}$$

hence, the ratio of the traction wheel radius to the offset distance is 3 to 1, or the same as the gear reduction ratio.

Regardless of the size of the traction wheel it is only necessary in all cases to divide its radius by the gear reduction ratio in order to determine the amount of offset that should be given the traction wheel in order to produce the results above described.

Similar reasoning will show that when the ratio of the traction wheel radius to the offset distance of the traction wheel is equal to the gear reduction ratio, and when the tracer is steered to make a turn of the kind shown in Fig. 5 the path of travel of the traction wheel is lessened by the proper amount to compensate for the slowing down of the rotation of the traction wheel caused by the planetary action of the gearing.

When the gearing is of the type shown in Fig. 3 a simple way to determine the distance which the traction wheel should be offset from the axis of the drive shaft in relation to the traction wheel radius is to give the traction wheel such a diameter, and offset it such an amount, that the point of contact of the gears 36 and 37, the point of intersection of the axes of the axle 39 and the drive shaft 28, and the point of contact of the traction wheel with the surface on which it rolls are in a straight line. When this condition is fulfilled, as shown in Fig. 3, W/L' (the ratio of the traction wheel radius to the traction wheel offset) is equal to G/L (the reduction ratio of the gearing).

It will now be seen that the invention overcomes the first-mentioned objection to power-driven tracers of the prior art and makes possible a tracer that is adapted to move a gas cutting-torch or other instrumentality at the same linear speed when the tracer is rounding a corner of the pattern, as when it is moving along a straight-line portion of the pattern.

Coming now to the question of objectionable steering torque produced by the driving of the traction wheel, it will be seen from Fig. 3 that a driving force D at the point of contact of the gears 36 and 37 acts at a radius L to produce a steering torque DL which tends to turn the member in which the traction wheel is journalled and thereby tends to steer the traction wheel as previously explained in connection with Fig. 1. However, the surface on which the traction wheel rolls provides a reactive force R acting at the radius L' to produce a counter steering torque RL'. Thus, when the traction wheel is positioned so that it is offset with respect to the axis of the drive shaft up to a certain limit the steering torque produced by the driving of the traction wheel is at least partly counteracted or nullified. When the gearing is of the type shown in Fig. 3 the steering torque is exactly counteracted or nullified so that it produces no bias on the automatic steering mechanism, when the traction wheel is offset by a distance such that the ratio of the traction wheel radius to such distance is equal to the reduction ratio of the gearing; in other words, when $$\frac{W}{L'} = \frac{G}{L}$$

in Fig. 3, as will be seen from the following:

$$\frac{W}{L'} = \frac{G}{L} = \text{Reduction ratio of drive gearing,}$$

and drive force $D \times G = $ Reactive force $R \times W$ $$G = \frac{RW}{D}$$

Substituting:

$$\frac{W}{L'} = \frac{RW}{DL}$$

$$DL = RL'$$

Since the steering torques are equal and opposite there is no net effect tending to steer the traction wheel, and the other objection to prior art power-driven tracers is thus overcome.

Figure 7:
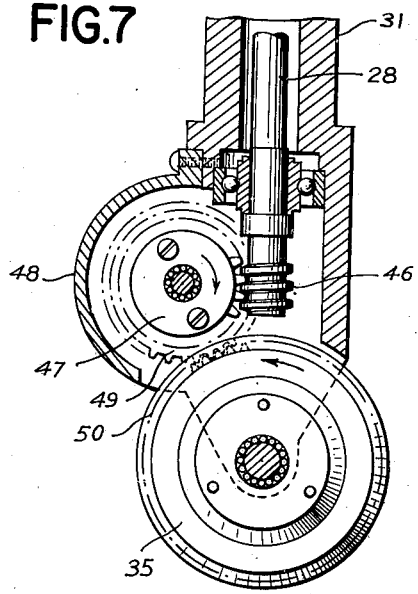
Fig. 7 is a vertical section through the lower portion of a modified form of traction wheel assembly embodying the invention.
Figure 8:
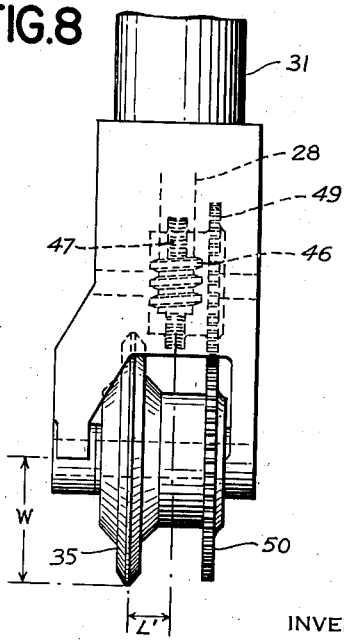
Fig. 8 is a front elevation of the traction wheel assembly shown in Fig. 7.

The invention is applicable to any type of reduction gearing between the drive shaft and the traction wheel so long as the overall reduction ratio of the gear train is used in determining the optimum amount that the traction wheel should be offset with respect to the axis of the drive shaft. Figs. 7 and 8 illustrate the invention as applied to worm gearing of a type frequently used in power-driven tracers. A worm 46 (Fig. 7) at the lower end of the drive shaft 28 meshes with a worm wheel 47 rotatably mounted in a housing 48 secured to the lower end of the rotatable sleeve 31. The worm wheel 47 is secured to a spur gear 49 which meshes with a spur gear 50 secured to the traction wheel 35. Fig. 8 shows the traction wheel offset with respect to the drive shaft 28 by a distance L'. The ratio of the radius W of the traction wheel to the offset distance L' is made equal to the overall reduction ratio of the entire train of gears if the speeding up or slowing down of the traction wheel due to the planetary action of the worm wheel 47 revolving around the worm 46 when the sleeve 31 is turned is to be completely compensated for in the manner previously described. In other words, if G represents the overall reduction ratio of the gears (drive shaft to traction wheel) W/L' should equal G.

Moreover, the steering torque produced by the driving of the traction wheel and which tends to turn the sleeve 31 about the axis of the drive shaft and thus steer the traction wheel is completely counteracted or nullified when the traction wheel is offset in that manner, i. e. when $$\frac{W}{L'} = G$$

This can be proved as follows:

Let $T_1 = $ Torque exerted by drive motor on drive shaft. (Driving torque as well as steering torque)

$R = $ Reactive force of tracing table surface on traction wheel.

$R \times W = T_1 \times G$ (1) $$T_1 = \frac{RW}{G}$$

(2) Counter steering torque $= R \times L'$

As above stated:

$$\frac{W}{L'} = G$$

hence, $$L' = \frac{W}{G}$$

Substituting in Equation 2:

Counter steering torque $= \frac{RW}{G}$ but, $$T_1 = \frac{RW}{G} \text{ (Equation 1)}$$

therefore, $RL' = T_1$

Hence, the steering torque ($T_1$) is completely compensated for by the counter steering torque (RL').

While the invention has been described as applied to a tracer, in its broader aspects, it is applicable to any self-propelled device or apparatus, such as a carriage, having a steerable traction wheel which is power-driven in the manner hereinbefore described, where it is desired that the carriage, or the like, travel at the same rate of speed when turning corners as when travelling in a straight line, or where it is desired that the driving of the traction wheel does not have an objectionable influence on the steering of the traction wheel.

As above shown, the same amount of offset of the traction wheel is required to compensate for the objectionable change in speed of rotation of the traction wheel when it is steered to cause the tracer or other apparatus to turn corners, as to compensate for the objectionable steering torque produced by the driving of the traction wheel, and this holds true for any type of gearing between the drive shaft and the traction wheel if friction is neglected. The theoretical amount of offset of the traction wheel required to bring about exact compensation for the objectionable conditions can be deviated from somewhat, if desired, to compensate for friction.

I claim:

1. Self-propelled steerable apparatus comprising a traction wheel, a member in which the traction wheel is rotatably mounted, a drive shaft for the traction wheel whose axis intersects the axis of rotation of the traction wheel, said member being rotatable about the axis of the drive shaft to steer the traction wheel, power means for rotating the drive shaft at a substantially constant speed, and reduction gearing between the drive shaft and the traction wheel, said traction wheel being positioned so that its point of contact with the surface along which the traction wheel travels is located to one side of the axis of the drive shaft.

2. Self-propelled steerable apparatus comprising a traction wheel, a member in which the traction wheel is rotatably mounted, a drive shaft for the traction wheel whose axis intersects the axis of rotation of the traction wheel, said member being rotatable about the axis of the drive shaft to steer the traction wheel, power means for rotating the drive shaft at a substantially constant speed, and reduction gearing between the drive shaft and the traction wheel, said traction wheel being positioned so that its point of contact with the surface along which the traction wheel travels is located to one side of the axis of the drive shaft by a distance such that the ratio of the traction wheel radius to such distance is substantially equal to the reduction ratio of said gearing.

3. Self-propelled steerable apparatus comprising a traction wheel, a member in which the traction wheel is rotatably mounted, a drive shaft for the traction wheel whose axis intersects the axis of rotation of the traction wheel, said member being rotatable about the axis of the drive shaft to steer the traction wheel, power means for rotating the drive shaft at a substantially constant speed, and reduction gearing between the drive shaft and the traction wheel including a driving gear on the drive shaft and a driven gear carried by said member which revolves around the driving gear in a planetary fashion when said member is rotated about the axis of the drive shaft to steer the traction wheel, said traction wheel being positioned so that its point of contact with the surface along which the traction wheel travels is located to one side of the axis of the drive shaft.

4. Self-propelled steerable apparatus comprising a traction wheel, a member in which the traction wheel is rotatably mounted, a drive shaft for the traction wheel whose axis intersects the axis of rotation of the traction wheel, said member being rotatable about the axis of the drive shaft to steer the traction wheel, power means for rotating the drive shaft at a substantially constant speed, and reduction gearing between the drive shaft and the traction wheel including a driving gear on the drive shaft and a driven gear carried by said member which revolves around the driving gear in a planetary fashion when said member is rotated about the axis of the drive shaft to steer the traction wheel, said traction wheel being positioned so that its point of contact with the surface along which the traction wheel travels is located to one side of the axis of the drive shaft by a distance such that the ratio of the traction wheel radius to such distance is substantially equal to the reduction ratio of said gearing.

5. In a tracer having a traction wheel, a member in which the traction wheel is rotatably mounted, a drive shaft for the traction wheel whose axis intersects the axis of rotation of the traction wheel, power means for rotating the drive shaft at a substantially constant speed, said member being rotatable about the axis of the drive shaft to steer the traction wheel so that a given point on the tracer can be made to trace an arc of a circle, and reduction gearing between the drive shaft and the traction wheel including a driving gear on the drive shaft and a driven gear carried by said member and which revolves around the driving gear with a planetary action when said member is rotated to steer the traction wheel and thereby speeds up or slows down the rotation of the traction wheel depending upon the direction in which said member is rotated, the improvement in which the traction wheel is positioned so that its point of contact with the surface along which the wheel travels is spaced to one side of the axis of the drive shaft whereby when said member is rotated to steer the traction wheel the traction wheel is caused to travel along an arc parallel to the arc followed by the axis of the drive shaft, the traction wheel being on that side of the axis of the drive shaft such that rotation of said member in a direction that speeds up the rotation of the traction wheel causes the traction wheel to travel in an arc which is outside the arc traced by the axis of the drive shaft and such that rotation of said member in a direction that slows down the rotation of the traction wheel causes the traction wheel to travel in an arc which is inside the arc traced by the axis of the drive shaft, and the distance that said point of contact of the traction wheel is spaced to one side of the axis of the drive shaft being such in relation to the traction wheel radius that for a given angular rotation of said member in a direction opposite to the direction of rotation of the drive shaft the arc in which the traction wheel travels is longer than the arc traced by the axis of the drive shaft by an amount which compensates for the speeding up of the traction wheel by said planetary action of the gearing and for a given angular rotation of said member in the opposite direction the arc in which the traction wheel travels is shorter than the arc traced by the axis of the drive shaft by an amount which compensates for the slowing down of the traction wheel by said planetary action of the gearing whereby said point on the tracer will always be moved by the traction wheel at a constant speed unaffected by said planetary action of the gearing when the traction wheel is steered to cause said point on the tracer to follow an arc.

6. In a self-propelled steerable apparatus having a traction wheel, a member in which the traction wheel is rotatably mounted, a drive shaft for the traction wheel whose axis intersects the axis of rotation of the traction wheel, said member being rotatable about the axis of the drive shaft to steer the traction wheel, power means for rotating the drive shaft, and reduction gearing between the drive shaft and the traction wheel including a driving gear on the drive shaft and a driven gear carried by said member and located laterally of the driving gear whereby rotation of the drive shaft to drive the traction wheel tends to produce undesired rotation of said member and hence undesired steering of the traction wheel, the improvement in which the traction wheel is positioned so that its point of contact with the surface along which the traction wheel travels is located to one side of the axis of the drive shaft.

7. In a self-propelled steerable apparatus having a traction wheel, a member in which the traction wheel is rotatably mounted, a drive shaft for the traction wheel whose axis intersects the axis of rotation of the traction wheel, said member being rotatable about the axis of the drive shaft to steer the traction wheel, power means for rotating the drive shaft, and reduction gearing between the drive shaft and the traction wheel including a driving gear on the drive shaft and a driven gear carried by said member and located laterally of the driving gear whereby rotation of the drive shaft to drive the traction wheel tends to produce undesired rotation of said member and hence undesired steering of the traction wheel, the improvement in which the traction wheel is positioned so that its point of contact with the surface along which the traction wheel travels is located to one side of the axis of the drive shaft by a distance such that the ratio of the traction wheel radius to such distance is substantially equal to the reduction ratio of said gearing.

8. In a tracer having a traction wheel, a member in which the traction wheel is rotatably mounted, a drive shaft for the traction wheel whose axis intersects the axis of rotation of the traction wheel, said member being rotatable about the axis of the drive shaft to steer the traction wheel, power means for rotating the drive shaft, automatic steering means operatively connected to said member to rotate it and automatically steer the traction wheel to cause the tracer to follow the outline of a pattern, and reduction gearing between said drive shaft and the traction wheel of the type which tends to produce undesired rotation of said member and hence produce an undesired effect on the automatic steering mechanism when the drive shaft rotates, the improvement in which the traction wheel is positioned so that its point of contact with the surface along which the traction wheel travels is located to one side of the axis of the drive shaft.

9. In a tracer having a traction wheel, a member in which the traction wheel is rotatably mounted, a drive shaft for the traction wheel whose axis intersects the axis of rotation of the traction wheel, said member being rotatable about the axis of the drive shaft to steer the traction wheel, power means for rotating the drive shaft, automatic steering means operatively connected to said member to rotate it and automatically steer the traction wheel to cause the tracer to follow the outline of a pattern, and reduction gearing between said drive shaft and the traction wheel of the type which tends to produce undesired rotation of said member and hence produce an undesired effect on the automatic steering mechanism when the drive shaft rotates, the improvement in which the traction wheel is positioned so that its point of contact with the surface along which the traction wheel travels is located to one side of the axis of the drive shaft by a distance such that the ratio of the traction wheel radius to such distance is substantially equal to the reduction ratio of said gearing.

10. In an electronic tracer for automatically tracing a pattern and having a traction wheel, a member in which the traction wheel is rotatably mounted, a drive shaft for the traction wheel whose axis intersects the axis of rotation of the traction wheel, said member being rotatable about the axis of the drive shaft to steer the traction wheel, automatic steering means operatively connected to said member including a photo-electric cell responsive to the amount of light received from the line of the pattern for rotating said member to automatically steer the traction wheel and cause the tracer to follow the line of the pattern, and reduction gearing between the drive shaft and the traction wheel of the type which tends to produce undesired rotation of said member and hence produce an undesired effect on the automatic steering means when the drive shaft rotates, the improvement in which the traction wheel is positioned so that its point of contact with the surface along which the traction wheel travels is located to one side of the axis of the drive shaft.

11. In an electronic tracer for automatically tracing a pattern and having a traction wheel, a member in which the traction wheel is rotatably mounted, a drive shaft for the traction wheel whose axis intersects the axis of rotation of the traction wheel, said member being rotatable about the axis of the drive shaft to steer the traction wheel, automatic steering means operatively connected to said member including a photo-electric cell responsive to the amount of light received from the line of the pattern for rotating said member to automatically steer the traction wheel and cause the tracer to follow the line of the pattern, and reduction gearing between the drive shaft and the traction wheel of the type which tends to produce undesired rotation of said member and hence produce an undesired effect on the automatic steering means when the drive shaft rotates, the improvement in which the traction wheel is positioned so that its point of contact with the surface along which the traction wheel travels is located to one side of the axis of the drive shaft by a distance such that the ratio of the traction wheel radius to such distance is substantially equal to the reduction ratio of said gearing.

NELSON E. ANDERSON.

REFERENCES CITED

The following references are of record in the file of this patent:

UNITED STATES PATENTS

| Number | Name | Date |
| --- | --- | --- |
| 2,172,313 | Young | Sept. 5, 1939 |
| 2,261,644 | Cockrell | Nov. 4, 1941 |
| 2,331,337 | Meyer | Oct. 12, 1943 |